E. KRONMAN.
COFFEE URN.
APPLICATION FILED DEC. 11, 1919.
1,352,069.
Patented Sept. 7, 1920.
5 SHEETS—SHEET 2.
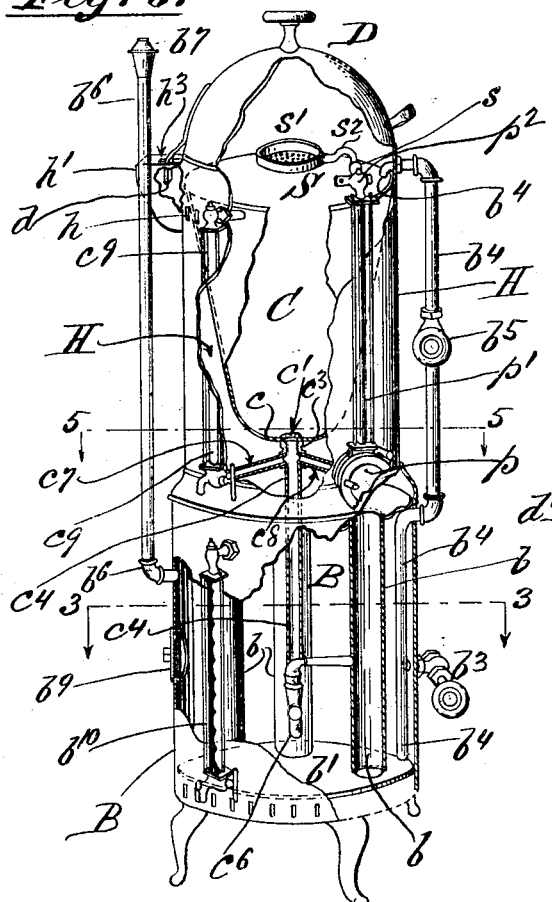
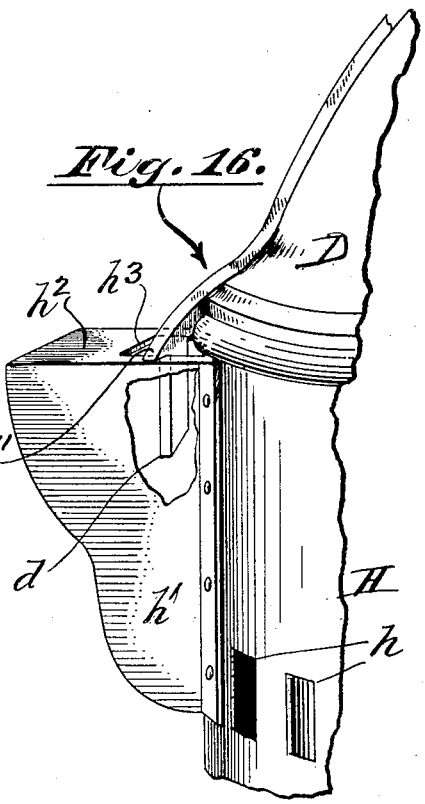
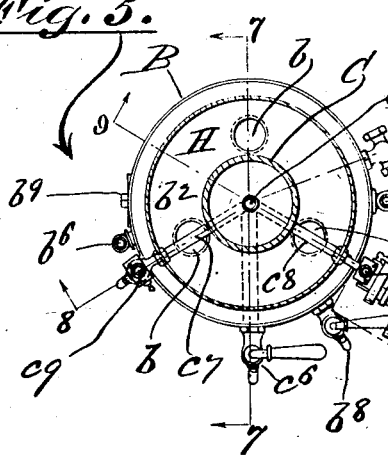
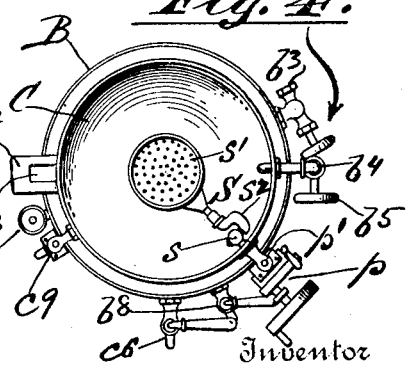
Inventor
Edward Kronman,
By his Attorney
Geo. Wm Hiatt

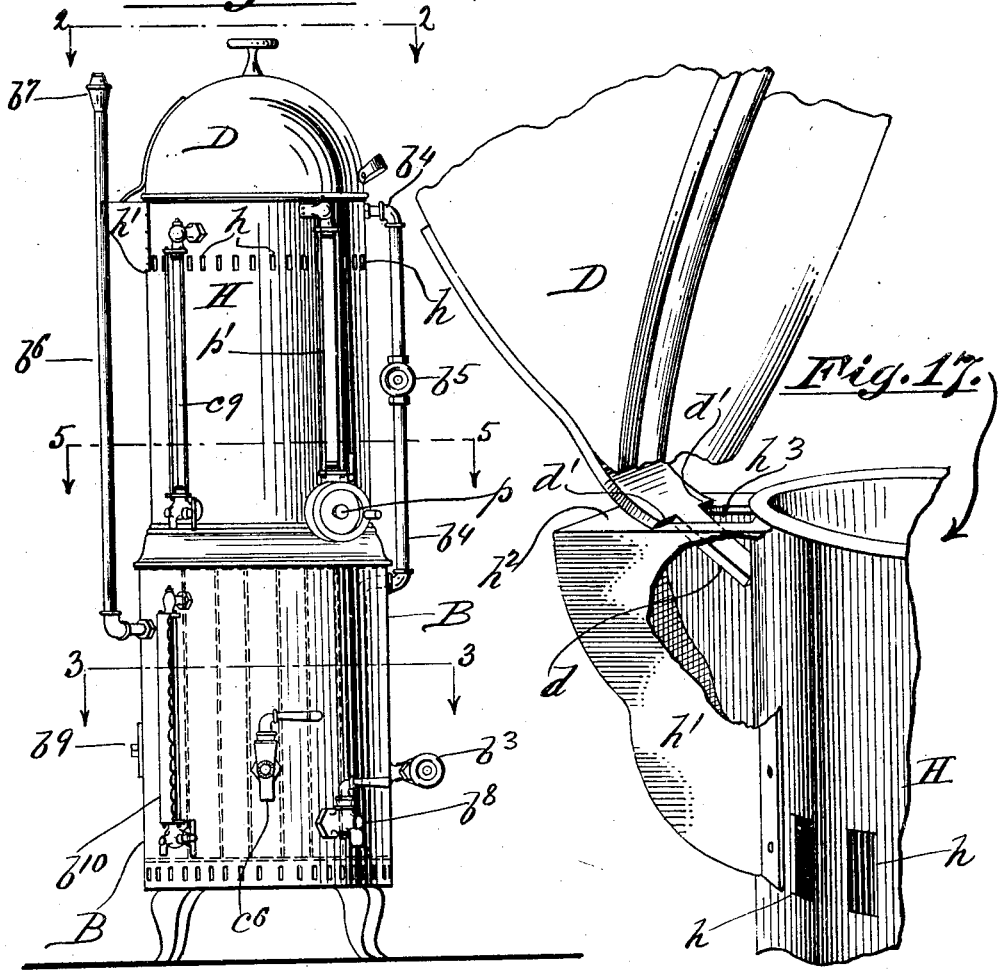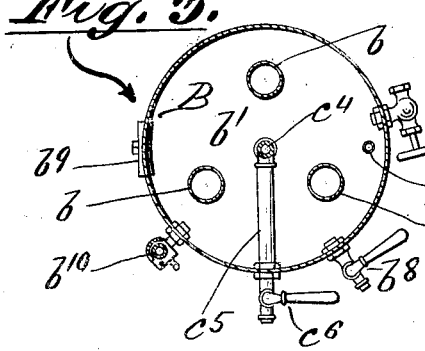

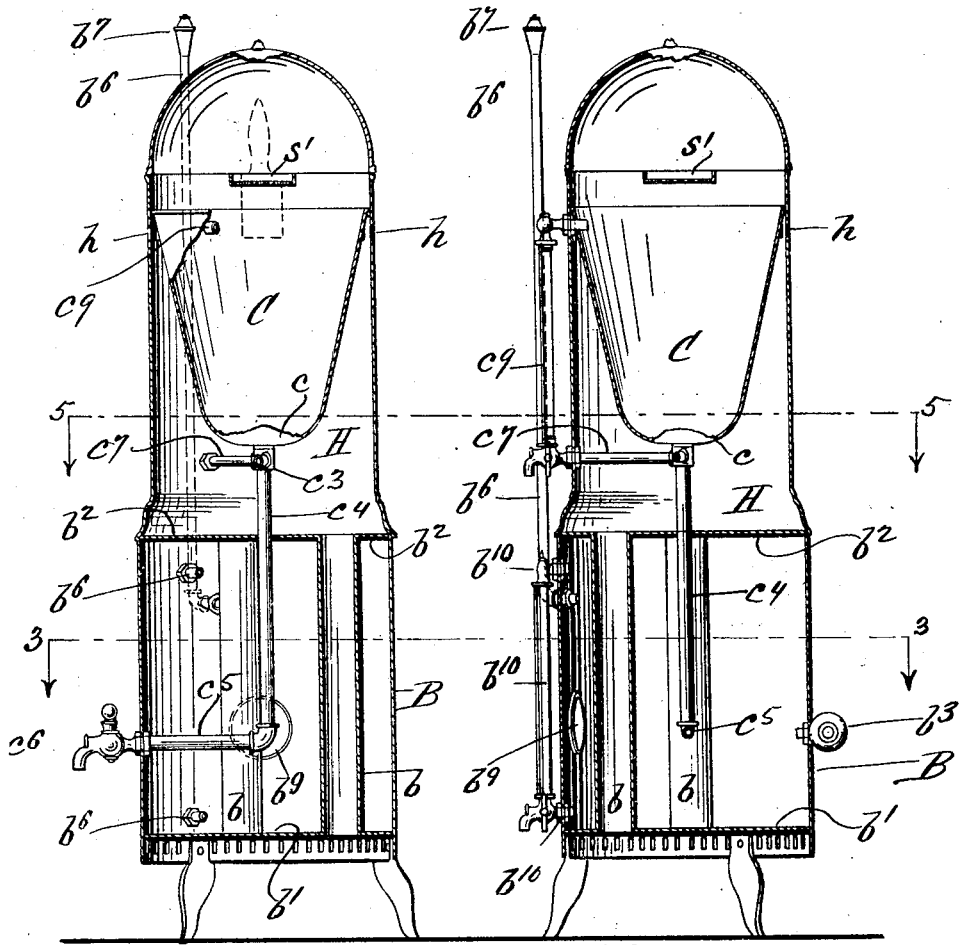

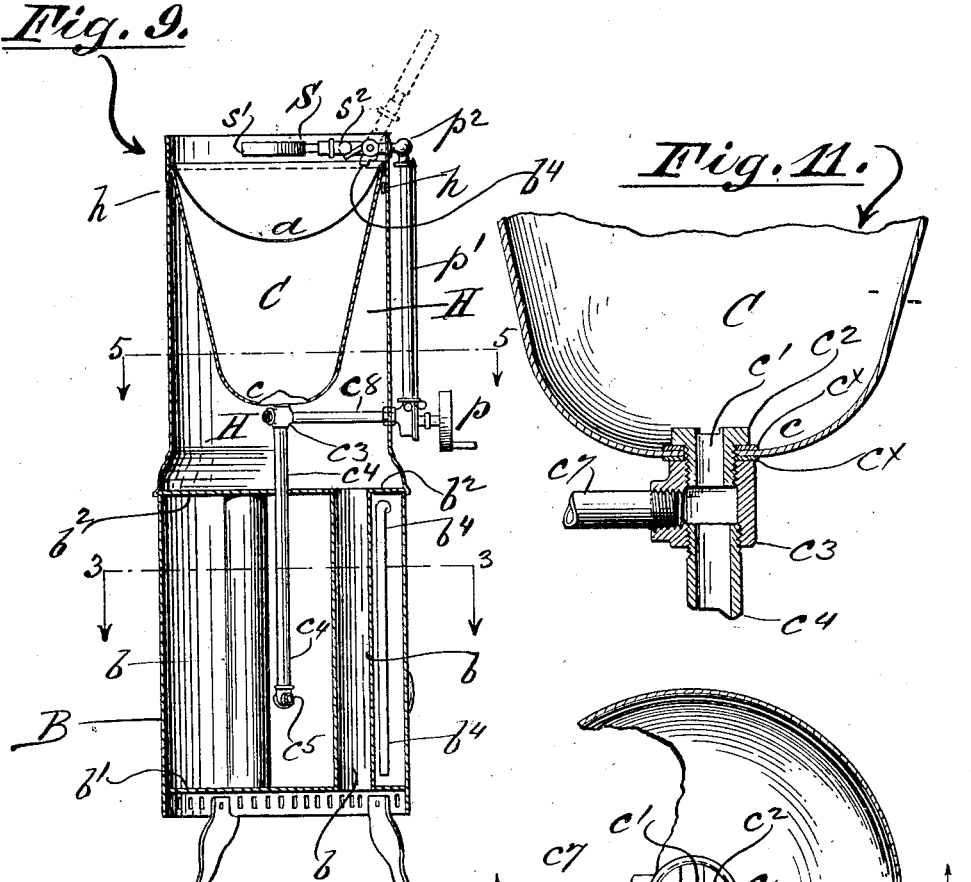

E. KRONMAN.
COFFEE URN.
APPLICATION FILED DEC. 11, 1919.
1,352,069.
Patented Sept. 7, 1920.
5 SHEETS—SHEET 5.
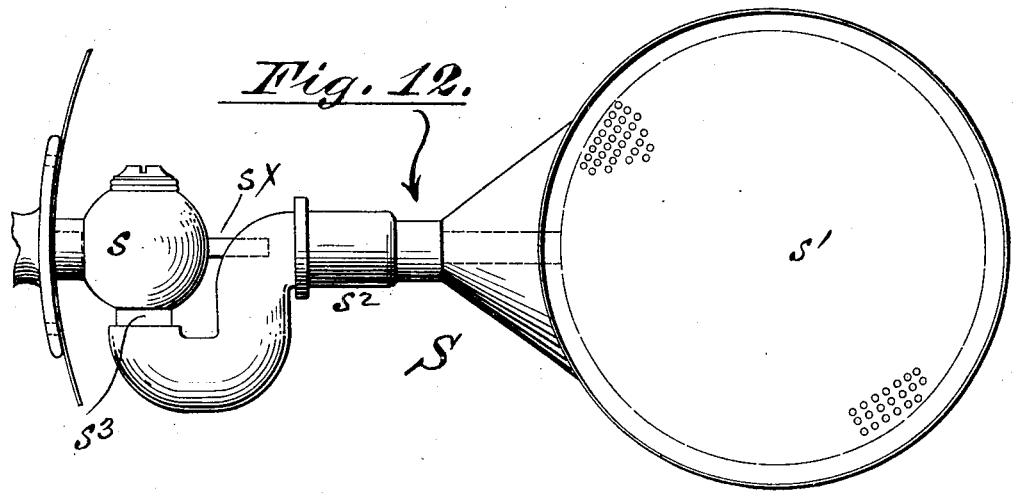
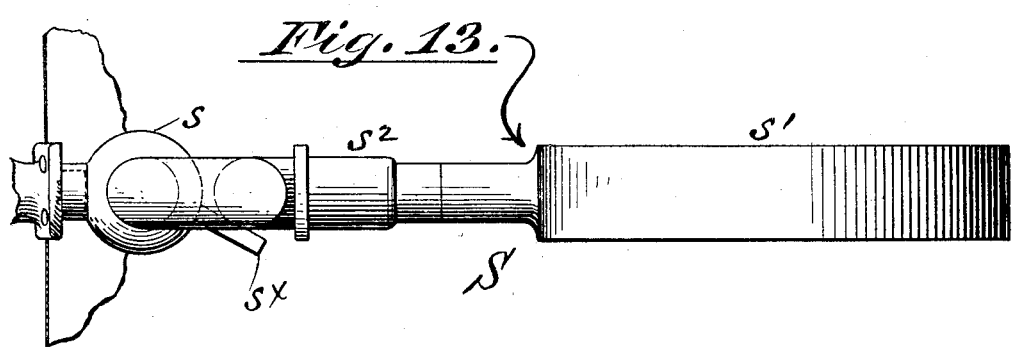
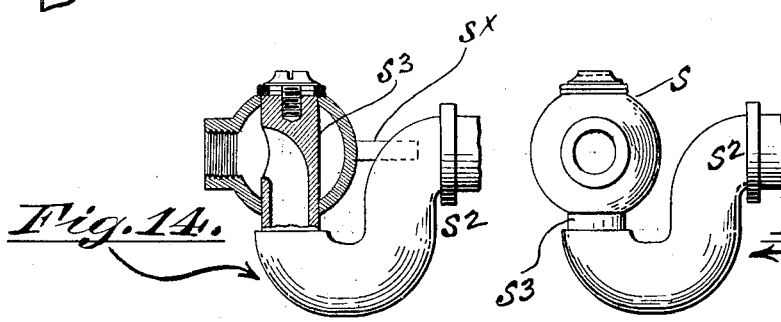
Inventor
Edward Kronman,
By his Attorney Geo. Williatt

UNITED STATES PATENT OFFICE.

EDWARD KRONMAN, OF NEW YORK, N. Y.

COFFEE-URN.

1,352,069.  Specification of Letters Patent.  Patented Sept. 7, 1920.

Application filed December 11, 1919. Serial No. 344,075.

*To all whom it may concern:*

Be it known that I, EDWARD KRONMAN, a citizen of the United States, and a resident of the borough of Manhattan, city, county, and State of New York, have invented certain new and useful Improvements in Coffee-Urns, of which the following is a specification.

The main object of my invention is the production of a water boiler and coffee urn combined in a unitary structure in such manner that the same source of heat is utilized to both boil water and maintain the coffee at a suitable temperature. By this means also I economize space as well as heat, and attain a compact, duplex apparatus in which the several functions may be conveniently effectuated and controlled, all as hereinafter more fully set forth,—the invention consisting essentially in the novel construction and arrangement of parts described and claimed,—distinctive features being the interposition of the water boiler between the source of heat and the coffee urn; the means of communication between water boiler and coffee urn; the means for creating a forced spray and circulation within the coffee urn; and other details of fabrication and operation to be mentioned specifically.

In the accompanying drawings,

Figure 1, is a front elevation of my unitary water boiler and coffee urn;

Fig. 2, is a top view thereof;

Fig. 3, is a horizontal section upon plane of line 3—3, Figs. 1, 6, 7, 8 and 9;

Fig. 4, is a top view of my apparatus with the cover removed;

Fig. 5, is a horizontal section taken upon plane of line 5—5, Figs. 1, 6, 7, 8 and 9;

Fig. 6, is a phantasmic sectional perspective view of my apparatus, illustrating the relation of parts both internal and external;

Fig. 7, is a central vertical sectional elevation taken upon plane of line 7—7, Fig. 5;

Fig. 8, is a central vertical sectional elevation taken upon plane of line 8—8, Fig. 5;

Fig. 9, is a central vertical sectional elevation taken upon plane of line 9—9, Fig. 5, with the cover raised or removed;

Fig. 10, is a horizontal sectional view, upon a larger scale, of the coffee container, broken away in part to show the lateral connections;

Fig. 11, is a sectional elevation taken upon plane of line 11—11, Fig. 10;

Fig. 12, is a top view of the liquid coffee spray device;

Fig. 13, is a side elevation thereof, partly broken away;

Fig. 14, is a sectional detail of the articulatory joint of said spray device;

Fig. 15, is a detail view of said articulatory joint showing the elbow of the joint as positioned upon the fulcrum knuckle when the spray pan is raised.

Figs. 16 and 17 are enlarged perspective views illustrating the construction and function of the lid articulating means.

The water boiler B, constitutes the basic section of the apparatus, on which is superposed the coffee urn section consisting of the high temperature chamber H, in which is positioned the coffee container C. The basic water section B, is preferably cylindrical in external configuration, or substantially so; and is formed with one or more (preferably three) flues $b$, $b$, $b$, extending from and through the bottom plate $b'$, to and through the top plate $b^2$. Water in the vessel B, is of course raised to the boiling point by heat applied to and below the bottom plate $b'$, by means of gas jets, or by any other suitable means, not shown but in a manner well known in the art. The hot air, and the gaseous products of combustion if gas is the heating medium, pass up through the flue or flues $b$, to the high temperature chamber H, finally escaping therefrom through the vent apertures $h$, $h$, in the upper side walls of the said temperature chamber H, just below the upper edge or rim of the coffee container C, so that the latter has the full benefit of the hot gaseous circulation thus attained.

The coffee container C, is preferably of inverted conoidal shape, its upper rim being united integrally and hermetically with the extension of the side walls of the high temperature chamber H, above the annular series of vent apertures $h, h$, aforesaid.

Water is supplied to the boiler B, through an inlet valve $b^3$, connected with a suitable source of supply, or by any other means that may be found most expedient. A stand pipe $b^4$, connects the lower part of the boiler B, with the upper part of the coffee container C, so that pressure generated in the boiler B, will force the water therefrom at boiling temperature into the coffee container, C, when desired,—a valve $b^5$, being interposed in said stand pipe $b^4$, to control the supply. $b^6$, is a stand pipe connected with the upper portion of the boiler B, and terminating in a safety valve $b^7$, for the relief of the boiler in case of excess of steam pressure. $b^8$, is a faucet connected directly with the interior of the boiler B, to afford means whereby hot water may be withdrawn from same as wanted. $b^9$, is a manhole in the side of the boiler B, to give access to the interior thereof when desired, for the removal of sediment, etc.; and $b^{10}$, is a liquid gage for indicating the water level in said boiler B.

The inverted conoidal coffee container C, is preferably formed with a cup-shaped bottom $c$, in the center of which is positioned the outlet port $c'$, formed in an externally threaded nipple $c^2$, engaging with a female threaded union coupling member $c^3$, as shown more particularly in Fig. 11, by which it will be seen that packing rings $c^x, c^x$, are interposed between the bottom $c$, of the container C, and said nipple $c^2$, and coupling member $c^3$, so as to hermetically seal the joint.

The threaded upper end of a pendent coffee discharge pipe $c^4$, is screwed onto the lower side of the union coupling member $c^3$, said coffee discharge pipe extending through the top plate $b^2$, of the boiler B, and centrally downward through the latter a suitable distance, the lower end of said discharge pipe $c^4$, terminating in a lateral branch $c^5$, which extends through the front wall of the boiler B, (as shown more particularly in Fig. 7) and is provided with a faucet $c^6$, by means of which the liquid coffee may be drawn off from the bottom of the container C, and dispensed as desired for immediate use. The positioning of the withdrawal pipes $c^4, c^5$, within the boiler B, and in direct contact with the boiling water therein, insures the dispensing of the liquid coffee at a temperature of 212° Fahrenheit or approximately so, which is a desideratum.

Connected with the union coupling member $c^3$, are also two lateral branch pipes $c^7$, and $c^8$,—the first of which, $c^7$, communicates with the lower end of a gage $c^9$, the upper end of which is connected with the upper part of the coffee container C, as shown more particularly in Fig. 8, thus providing means whereby the level of liquid coffee in the said container C, may be observed at all times. The other branch pipe $c^8$, as will be seen by reference more particularly to Fig. 9, connects the coffee outlet $c'$, with a rotary hand pump $p$, such for instance as of the type set forth in Letters Patent No. 755,041, dated March 22, 1904, by means of which coffee may be withdrawn from the bottom of the container C, and returned to the top of said container C, through a pump $p'$, the upper extremity of which latter connects with an elbow $p^2$, connected in turn with a hollow knuckle $s$, within the casing above the container C, said knuckle $s$, constituting the fulcrum support for the spraying device S, by which the elevated stream of coffee is injected in the form of a medial shower into said container. This may be done for the purpose of attaining and maintaining an infusion of uniform consistency, counteracting any sedimental tendency by enforced circulation; and is especially efficacious in attaining primary concoction from ground coffee contained in a peripherally ringed percolator bag (as $a$, Fig. 9) suspended across the top of the container C, in a manner well known in the art of coffee making in urns and containers of various kinds.

In order to provide for and facilitate the positioning and removal of the percolator bag $a$, in and from the top of the container, I construct my sprinkler device S, so that the sprinkling pan $s'$, and its hollow bracket arms $s^2$, may be turned upward and outward as shown in dotted lines in Fig. 9. To this end the stationary knuckle $s$, with which the elbow $p^2$, of the pump tube $p'$, connects as before stated, is preferably made of globular form, and the hollow bracket arm $s^2$, is formed with a hollow trunnion $s^3$, as shown more particularly in Fig. 14. A protuberant arm on the under side of the knuckle $s$, constitutes a stop or rest $s^x$, to sustain the sprinkler in horizontal position over the top of the container C. In Fig. 12, only a few perforations are shown, but it is to be understood in this connection that the bottom of the sprinkler pan $s'$, is reticulated throughout the main portion of its area.

The sprinkling or spraying device S, is an important factor in connection with my unitary structure of duplex apparatus in that re-pouring may be effected positively at any time by means of the hand pump $p$, without lifting the cover as heretofore, which permitted the aroma of the coffee to escape, together with vapor and steam, the latter being especially objectionable for obvious reasons. In this and other respects my apparatus is essentially self contained, in that the urn may be supplied automatically with water from the boiler, and a forced circulation effected through the urn itself, without opening up the apparatus, and by the manipulation of extraneous adjuncts only.

Furthermore, the repouring of the liquid infusion in the closed urn effects a material saving in the amount of ground coffee required to maintain a prescribed degree of strength and quality, while the economy effected by the utilization of the otherwise waste heat from the boiler to maintain the liquid coffee in the urn at a sufficient and relatively high temperature, is another important practical advantage which materially reduces the cost of production.

The pump tube $p'$, is preferably made of glass so that the forced circulation of liquid coffee may be observed externally without the opening or removal of the lid D.

The latter is removably supported on the shell of the high temperature chamber H, in a novel manner in that it may be swung open and back and supported in such position like a hinged cover by means that also admit of its removal bodily when desired without the detachment of pintlets, as would be necessary in the case of an ordinary hinge support. That is to say, I provide an unattached, readily removable lid D, adapted to perform also the functions of a hinged cover, as may be found most desirable or convenient. To this end I furnish the shell of the high temperature compartment H, with a bracket extension $h'$, in the form of a hollow socket, the top plate $h^2$, of which has an elongated slot $h^3$; and I provide the lid or cover D, with a shouldered prop-tongue $d$, adapted to protrude through said slot $h^2$, into said bracket socket $h'$, as shown more particularly in Figs. 16 and 17, of the drawings. The shoulders $d'$, $d'$, of the prop-tongue $d$, rest normally (that is, as long as the lid is supported on the casing) upon the top plate $h^2$, of the bracket socket $h'$, but the prop-tongue below the shoulders $d'$, $d'$, is longer than the slot $h^2$, so that when the lid D, is opened and turned back sufficiently to position the shoulders $d'$, $d'$, and intermediate part of the prop-tongue $d$, at the rear of the said bracket slot $h^2$, as in Fig. 17, the lower end of the prop-tongue $d$, will impinge and rest against the outer wall of the high temperature chamber H, and thereby support the lid in elevated position,—the weight of the lid insuring stability in such position because its center of gravity is well beyond and back of the pivotal line of support,— i. e., the rear edge of the slot $h^2$, of the bracket socket $h'$. Of course the length of the prop-tongue $d$, below its shoulders $d'$, $d'$, as related to the length of the slot $h^3$, will determine the angle of inclination at which the lid will be thus supported in open position; but irrespective of its length the prop-tongue $d$, is always readily detachable (unless in the exact position shown in Fig. 17) from said slot $h^3$, so that the lid D, may be freely raised and removed bodily from the top of the casing whenever desired.

It may be noted in this connection that the socket bracket $h'$, for the support of the lid D, in open tilted position as above set forth is approximately opposite to the fulcrum support afforded for the spraying device S, so that there may be no interference in function, although when a fresh percolator $a$, is to be positioned in the top of the container C, the lid is preferably lifted off the casing temporarily. For ordinary purposes however, the removal of the lid is not necessary, the tilting of the same, and its support in open position as above, answering all practical purposes, except possibly for cleansing purposes. Hence, this method of detachably supporting the cover D, obviates the necessity for its removal and temporary storage in a suitable place (not always convenient to find under ordinary conditions of use),—the cover remaining safely and accessibly connected with the casing.

By the use of the stand pipe $b^4$, and control valve $b^5$, the delay, inconvenience, and labor of charging the coffee container with boiling water by extraneous means, as heretofore, is obviated,—such feed being effected and controlled automatically as desired by the simple manipulating of the valve $b^5$,—the pressure in the boiler B, insuring a siphonic-like transfer of hot water from the lower portion of the boiler to the container above the percolator positioned therein.

One of the most important practical advantages attained by my unitary combination of boiler and coffee urn is the great saving thereby effected in installation space, since by my invention it is possible in a single apparatus to furnish boiling water and coffee in quantity equal to the output of and a set of two or three coffee urns and a boiler as heretofore arranged for use with relation to each other. Obviously the economy in horizontal area and floor space thus achieved is an important factor, especially where available space is restricted or lacking. Furthermore the apparatus is so simple both in construction and operation that skilled labor is not essential for its care and manipulation.

The inverted conoidal shape of the coffee container C, is important in that it affords ample area for the hot gases delivered through the boiler flues $b$, $b$, to the high temperature compartment H, the lowest portion of which is obviously the hottest,—the sloping, convergent sides of the container C, being best adapted to contact uniformly with and absorb the heat from the hot gases as they rise to escape through the vent holes $h, h$.

By the term "hot air" as applied herein to the boiler flues $b, b$, I mean to include also gaseous products of combustion, if any, accompanying the air current.

What I claim as my invention and desire to secure by Letters Patent is,—

1. A unitary water boiler and coffee urn of the character designated, comprising a basic boiler surmounted by a high temperature compartment heated by hot air boiler flue means, a coffee container positioned in said high temperature compartment, a hot water stand pipe connecting the lower portion of said boiler with the upper part of said coffee container, a valve interposed in said hot water stand pipe and a discharge pipe disposed within the boiler, repour piping connecting the lower portion of said coffee container with a spraying device in the upper part thereof, and a pump interposed in said repour piping for effecting a forced circulation of the liquid coffee.

2. A unitary water boiler and coffee urn of the character designated, comprising a basic boiler surmounted by a high temperature compartment heated by hot air boiler flue means, a coffee container positioned in said high temperature compartment, a hot water stand pipe connecting the lower portion of said boiler with the upper part of said coffee container, a valve interposed in said hot water stand pipe, repour piping connecting the lower portion of said coffee container with a spraying device in the upper part thereof, said sprinkling device being particularly connected with the repour piping, for the purpose described.

3. A unitary water boiler and coffee urn of the character designated, comprising a basic boiler surmounted by a high temperature compartment heated by hot air boiler flue means, a coffee container positioned in said high temperature compartment, a hot water stand pipe connecting the lower portion of said boiler with the upper portion of said coffee container, a valve interposed in said hot water stand pipe, a hot water faucet communicating directly with the interior of said boiler, repour piping connecting the lower part of said coffee container with the upper part thereof, a pump interposed in said repour piping, a discharge conduit connected with the lower part of said coffee container and extending through said boiler, and a dispensing faucet on the outer extremity of said discharge conduit, for the purpose described.

4. A unitary water boiler and coffee urn of the character designated, comprising a basic boiler surmounted by a high temperature compartment heated by hot air boiler flue means, a coffee container positioned in said high temperature compartment, a hot water stand pipe connecting the lower portion of said boiler with the upper portion of said coffee container, a valve interposed in said hot water pipe, a hot water faucet connecting directly with the interior of said boiler, repour piping connecting the lower portion of said coffee container with a sprinkling device in the upper part thereof, a pump interposed in said repour piping, a discharge conduit connected with the lower part of said coffee container and extending through the said boiler, and a dispensing faucet on the outer extremity of said discharge conduit, for the purpose described.

5. A unitary water boiler and coffee urn of the character designated, comprising a basic boiler surmounted by a high temperature compartment heated by hot air boiler flue means, a coffee container positioned in said high temperature compartment, a hot water stand pipe connecting the lower portion of said boiler with the upper portion of said coffee container, a valve interposed in said hot water pipe, a discharge conduit connected with the lower portion of said coffee container by means of a union coupling member and extending through the said boiler and provided with a dispensing faucet at its outer extremity, repour piping connected with the lower portion of said coffee container by means of said union coupling member and extending into the top of said coffee container, a pump interposed in said repour piping, and branch pipe connecting said union coupling member with an external liquid level gage which is also connected with the upper part of said coffee container, for the purpose described.

EDWARD KRONMAN.

Witnesses:
GEO. WM. MIATT,
DOROTHY MIATT.